Aug. 12, 1969     T. J. O'CONNOR     3,461,267
QUICK-CHANGE TOOL FOR ELECTRICAL-EROSION
MACHINING OF AN ARCUATE OPENING
Filed Jan. 8, 1968
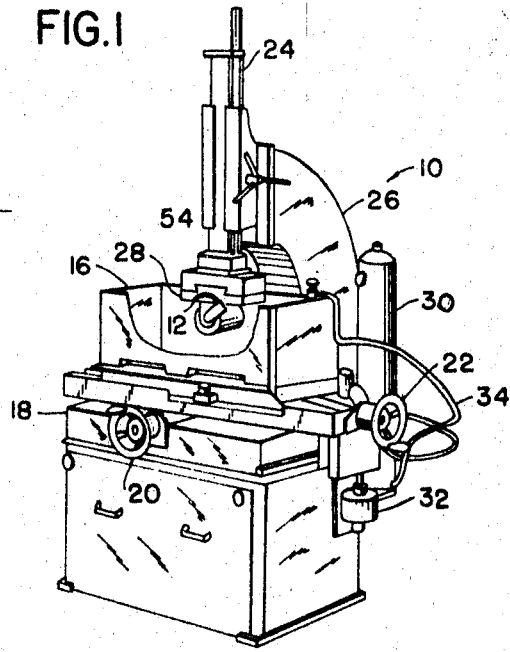
FIG.1
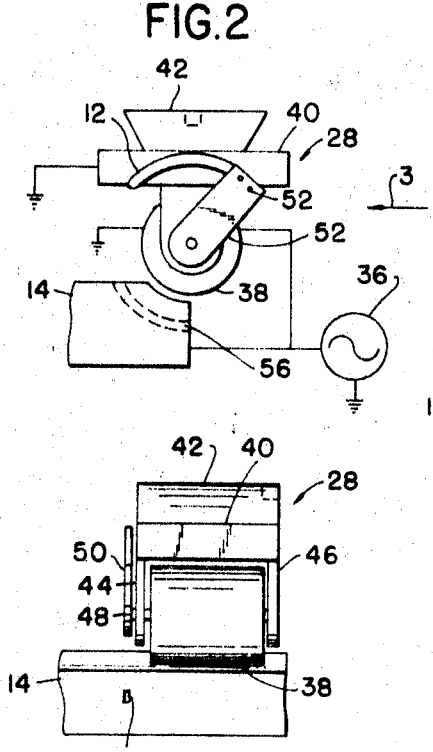
FIG.2
FIG.3
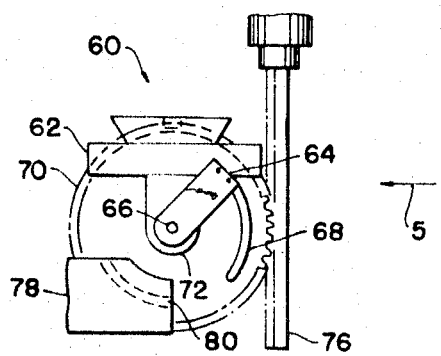
FIG.4
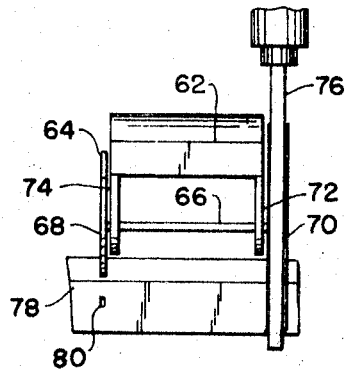
FIG.5
INVENTOR
THOMAS J. O'CONNOR
BY *Whittemore*
*Hulbert & Belknap*
ATTORNEYS

United States Patent Office 3,461,267
Patented Aug. 12, 1969

3,461,267
QUICK-CHANGE TOOL FOR ELECTRICAL-EROSION MACHINING OF AN ARCUATE OPENING
Thomas J. O'Connor, 100 Morgan Road,
Ann Arbor, Mich. 48104
Continuation-in-part of application Ser. No. 504,971, Oct. 24, 1965. This application Jan. 8, 1968, Ser. No. 696,283
Int. Cl. B23k 9/16; B23p 1/00
U.S. Cl. 219—69
4 Claims

ABSTRACT OF THE DISCLOSURE

A tool for use with electrical machining apparatus to enable the cutting of arcuate holes through a conducting workpiece is disclosed. The tool includes means for rapidly and accurately securing the tool to the electrical machining apparatus, means for securing an arcuate electrode to the tool and means for moving the arcuate electrode in a circular path responsive to the spark gap between the electrode and workpiece. In one embodiment the means for moving the arcuate electrode includes a servo motor directly connected to the means for securing the electrode to the tool. In a second embodiment the means for moving the arcuate electrode includes a gear connected to the means for securing the electrode to the tool and rack means responsive to the spark gap between the workpiece and electrode engaged with the gear for rotation of the gear.

CROSS REFERENCE TO RELATED APPLICATIONS

This application is a continuation-in-part of application Ser. No. 504,971, filed Oct. 24, 1965, now Patent No. 3,363,083, issued Jan. 9, 1968 which application is a continuation-in-part of application Ser. No. 250,321, filed Jan. 9, 1963, now Patent No. 3,222,494, issued Dec. 7, 1965.

BACKGROUND OF THE INVENTION

Field of the invention

The invention relates to electrical machining and refers more specifically to a quick-change tool for supporting and moving an arcuate electrode in a manner to cut an arcuate hole in a conducting workpiece in conjunction with electrical machining apparatus.

Description of the prior art

In the past to provide arcuate openings through workpieces of, for example die metal, it has been necessary to form the opening in separate parts and later connect the parts together to provide a complete opening through the workpiece. No previously known machining methods have been capable of producing arcuate openings in such workpieces to required tolerances since direct machining of the arcuate holes has been impossible or at least extremely impractical.

SUMMARY OF THE INVENTION

In accordance with the invention there is provided a quick-change tool for moving an electrode to electrically machine an arcuate opening in a conducting workpiece in conjunction with electrical machining apparatus.

In one modification of the invention, the tool includes means for moving an arcuate electrode secured thereto in a circular path about the center of curvature of the electrode, including a servo motor connected to provide the movement of the electrode in response to a spark gap between the electrode and a workpiece and means for rapidly and accurately securing the tool to electrical machining apparatus.

In another modification of the invention the tool includes means for moving an arcuate electrode secured thereto in a circular path about the center of curvature of the electrode, a gear connected to provide the movement of the electrode rack means engaged with the gear for moving the gear in response to a spark gap between the electrode and a workpiece and means for rapidly and accurately securing the tool to electrical machining apparatus.

BRIEF DESCRIPTION OF THE DRAWINGS

FIGURE 1 is a perspective view of electrical machining apparatus having a quick-change tool for cutting arcuate openings in a conducting workpiece constructed in accordance with the invention mounted thereon.

FIGURE 2 is an enlarged elevation view of the quick-change tool illustrated in FIGURE 1 shown in conjunction with a schematic diagram for the electrical machining apparatus illustrated in FIGURE 1 and a workpiece.

FIGURE 3 is another elevation view of the quick-change tool and workpiece illustrated in FIGURE 2 taken in the direction of arrow 3 in FIGURE 2.

FIGURE 4 is an elevation view of another embodiment of the quick-change tool of the invention similar to the elevation view of FIGURE 2 without the schematic diagram.

FIGURE 5 is another elevation view of the quick-change tool illustrated in FIGURE 4 taken in the direction of arrow 5 in FIGURE 4.

DESCRIPTION OF THE PREFERRED EMBODIMENTS

The electrical discharge machine mechanical section 10 illustrated in FIGURE 1 is adapted to be connected to an electrical discharge power supply to provide electrical machining apparatus capable of machining conducting workpieces by means of electric sparks passing between the arcuate electrode 12 secured to the quick-change tool 28 and the conducting workpiece 14 in a dielectric medium as set forth in the references cited in the cross-referenced patent and application. Electrical machining apparatus will be considered only briefly herein.

As shown in FIGURE 1, the dielectric tank 16 of the mechanical section 10 of the electrical machining apparatus is mounted on a table 18 for movement in a horizontal plane along perpendicular axis on turning the cranks 20 and 22 connected to ball nut and screw adjusting mechanisms. A ram 24 is supported on frame 26 for vertical movement either mechanically or by servo means responsive to the spark gap between the electrode 12 and the workpiece 14. A filter system 30, dielectric pump 32 and suitable connections 34 for maintaining dielectric fluid in the tank 16 during machining operations in the usual manner is also provided in the mechanical section 10 of the electrical machining apparatus.

The power supply portion 36 of the electrical machining apparatus is illustrated only schematically in FIGURE 2. Thus, the power supply 36 is shown in FIGURE 2 as a source of pulsed direct current electrical energy, one terminal of which is connected to the metal workpiece 14 and the other terminal of which is connected through the tool 28 to the electrode 12. In accordance with the usual electrical machining apparatus servo systems the servomotor 38 is connected in parallel with the gap between the electrode 12 and workpiece 14. Therefore, the servomotor 38 is driven in response to the spark gap between the electrode 12 and workpiece 14.

The quick-change tool 28 includes the base plate 40 having a dovetail portion 42 extending from one side thereof whereby the tool 28 may be rapidly and accurately interchanged on the mechanical section 10 of the electrical machining apparatus with other quick-change tools as set forth in the cross-referenced related patent and application. A pair of supporting brackets 44 and 46 depend from the other side of the base plate 40.

The servo motor 38 is supported between the brackets 44 and 46 and when energized rotates the motor shaft 48. An electrode supporting and securing member 50 is secured to the motor shaft 48 for rotation therewith. The arcuate electrode 12 is secured to the electrode supporting and securing member 50 by convenient means, such as an opening in the electrode supporting and securing member 50 and setscrews.

The center of curvature of the arcuate electrode 12 is at the longitudinal axis of the motor shaft 48. Thus, on movement of the electrode supporting and securing member 50 with shaft 48, the arcuate electrode 12 is moved in a circular path about the axis of the motor shaft 48. The circular path described by the electrode 12 will have the radius of curvature of the arcuate electrode 12.

In overall operation of the electric machining apparatus in conjunction with the quick-change tool 28, quick-change tool 28 is supported on the ram 24 in the dovetail platen 54 in the manner set forth in more detail in the cross-referenced patent and patent application.

The conducting workpiece 14 is positioned in the dielectric tank 16 in the path of the arcuate electrode 12 on rotation of the motor shaft 38. The electrode 12 is moved toward the workpiece 14 to establish a spark gap therebetween across which the electrical energy from power supply 36 is placed to provide spark machining.

The motor 38 is then driven in accordance with the usual servo drive of the electrical machining apparatus, whereby an arcuate opening 56 is provided through the workpiece 14. The arcuate opening 56 will be without parting lines and will be machined to exact tolerances with a desired surface finish.

The quick-change tool 60 for electrical machining illustrated in FIGURES 4 and 5 is similar to the tool 40 in that a base plate 62 is provided with a dovetail portion by which the tool 60 is secured to the dovetail platen 54 on ram 24, as before. Also, the electrode supporting and securing member 64 is carried by shaft 66 equivalent to the motor shaft 48 for rotation therewith to move the arcuate electrode 68 through the conducting workpiece 70, as before.

However, in the embodiment 60 of the quick-change tool structure, the motor 38 of the tool 40 is replaced by a gear 70 secured to the shaft 66 which is rotatably supported in the supporting brackets 72 and 74. The gear 70 is positioned in mesh with a rack 76 which in turn may be driven by a servomotor responsive to the spark gap between the electrode 68 and workpiece 70.

The operation of the quick-change tool 60 in conjunction with electric machining apparatus, as illustrated in FIGURES 1 and 2, is similar to the operation of the quick-change tool 40 in that as the rack 76 is moved down as shown in FIGURE 4 to maintain a predetermined spark gap between the electrode 68 and the workpiece 78, an arcuate opening 80 will be machined through the workpiece 78 due to arcuate movement of the electrode 68 connected to the electrode supporting and securing member 64 with the shaft 66 connected to the gear 70.

While two embodiments of the present invention have been considered in detail, it will be understood that other embodiments and modifications thereof are contemplated. It is the intention to include all embodiments and modifications of the disclosed quick-change tool as are defined by the appended claims within the scope of the invention.

What I claim as my invention is:

1. A quick-change tool for use with electrical machining apparatus to machine an arcuate opening in a conducting workpiece comprising a base plate, means secured to the base plate for securing the tool to electrical machining apparatus, a pair of spaced apart supporting brackets extending from the base plate, an electrical servo motor positioned vetween the brackets and mounted thereby, an output shaft driven by the servo motor extending through one of the brackets, an electrode supporting member, one end of which is secured to the output shaft of the motor for rotation with the output shaft, and an arcuate electrode secured to the other end of the electrode supporting member having a center of curvature on the axis of rotation of the motor output shaft, whereby on rotation of the motor output shaft the arcuate longitudinal axis of the electrode describes a circle having a center at the axis of rotation of the output shaft.

2. Structure as set forth in claim 1 wherein the means for securing the tool to electrical machining apparatus comprises a dovetail portion extending from one side of the base plate and wherein the brackets extend from the other side of the base plate.

3. A quick-change tool for use with electrical machining apparatus to machine an arcuate opening in a conducting workpiece comprising a base plate, means secured to the base plate for securing the tool to electrical machining apparatus, a pair of spaced apart supporting brackets extending from the base plate, a shaft rotatably mounted in and extending through the brackets at both ends thereof, a gear secured to one end of the shaft, a rack in mesh with the gear supported by the electrical machining apparatus and movable in accordance with the spark gap between an electrode carried by the tool and the conductive workpiece, an electrode supporting member secured at one end to the other end of the shaft for rotation therewith about the center of rotation of the shaft, an arcuate electrode secured to the other end of the electrode supporting member having an arcuate longitudinal axis concentric with the axis of rotation of the shaft and secured to the other end of the electrode supporting member in a position whereby on rotation of the output shaft the arcuate longitudinal axis of the electrode describes a circular path concentric with the axis of rotation of the shaft.

4. Structure as set forth in claim 3, wherein the means for securing the tool to electrical machining apparatus comprises a dovetail portion extending from one side of the base plate and wherein the supporting brackets extend from the other side of the base plate.

References Cited

UNITED STATES PATENTS

| | | | |
|---|---|---|---|
| 658,821 | 10/1900 | Woolley | 310—36 |
| 1,893,025 | 1/1933 | Gregory et al. | 310—39 |
| 2,449,901 | 9/1948 | Kaiser | 310—36 |
| 3,339,510 | 9/1967 | Clarke et al. | |
| 2,539,439 | 1/1951 | Kumler. | |
| 2,902,584 | 9/1959 | Ullmann. | |
| 3,200,231 | 8/1965 | Bejat. | |

JOSEPH V. TRUHE, Primary Examiner

R. F. STAUBLY, Assistant Examiner

U.S. Cl. X.R.

74—91; 204—143